(12) United States Patent
Schulz et al.

(10) Patent No.: US 6,565,263 B2
(45) Date of Patent: May 20, 2003

(54) OPTICAL PLUG-IN CONNECTOR

(75) Inventors: Klaus Schulz, Berlin (DE); Melchior Lutz, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/095,313

(22) Filed: Mar. 11, 2002

(65) Prior Publication Data

US 2002/0094171 A1 Jul. 18, 2002

Related U.S. Application Data

(63) Continuation of application No. PCT/DE00/03198, filed on Sep. 11, 2000.

(30) Foreign Application Priority Data

Sep. 9, 1999 (DE) .......................................... 199 44 895

(51) Int. Cl.[7] ................................................. G02B 6/36
(52) U.S. Cl. .......................................... 385/76; 439/352
(58) Field of Search ........................ 439/350, 352–358; 385/76

(56) References Cited

U.S. PATENT DOCUMENTS

| 4,762,388 A | 8/1988 | Tanaka et al. |
| 4,798,430 A | 1/1989 | Johnson et al. |
| 5,233,674 A | 8/1993 | Vladic |
| 5,314,347 A * | 5/1994 | Colleran et al. |
| 5,359,686 A | 10/1994 | Galloway et al. |
| 5,672,071 A * | 9/1997 | Ceru |

FOREIGN PATENT DOCUMENTS

| DE | 38 18 717 C2 | 12/1988 |
| EP | 0 456 298 A1 | 11/1991 |
| EP | 0 618 468 A1 | 10/1994 |
| JP | 63 026 608 | 2/1988 |
| WO | WO 96/24208 | 8/1996 |

* cited by examiner

Primary Examiner—Khiem Nguyen
(74) Attorney, Agent, or Firm—Laurence A. Greenberg; Werner H. Stemer; Ralph E. Locher

(57) ABSTRACT

The plug connector extends along a main axis and at least one optical waveguide end terminates in a connector housing. Locking parts, which are preferably symmetrically placed on the narrow sides of the connector housing, each have a detent element. An actuating element can be actuated to displace the detent elements from a locking position into a release position. The direction of displacement of the actuating element extends substantially perpendicular to the main axis of the plug connector and it is different from the direction along which the detent elements move between the locking and release positions.

10 Claims, 1 Drawing Sheet

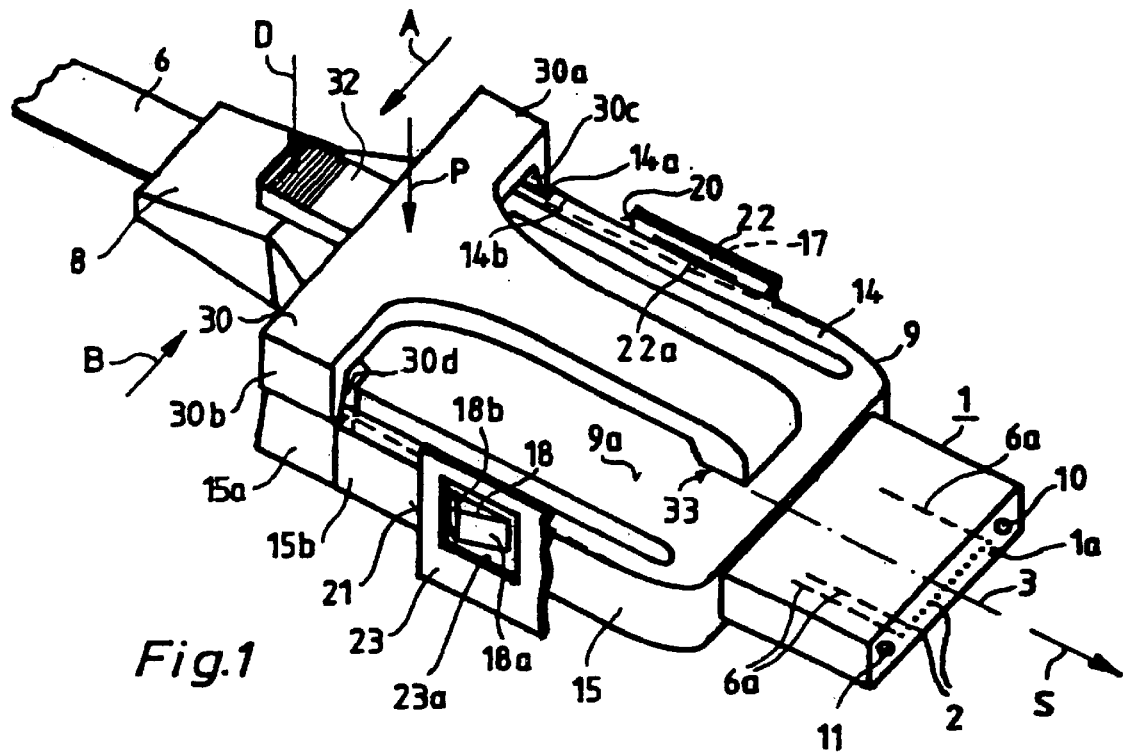
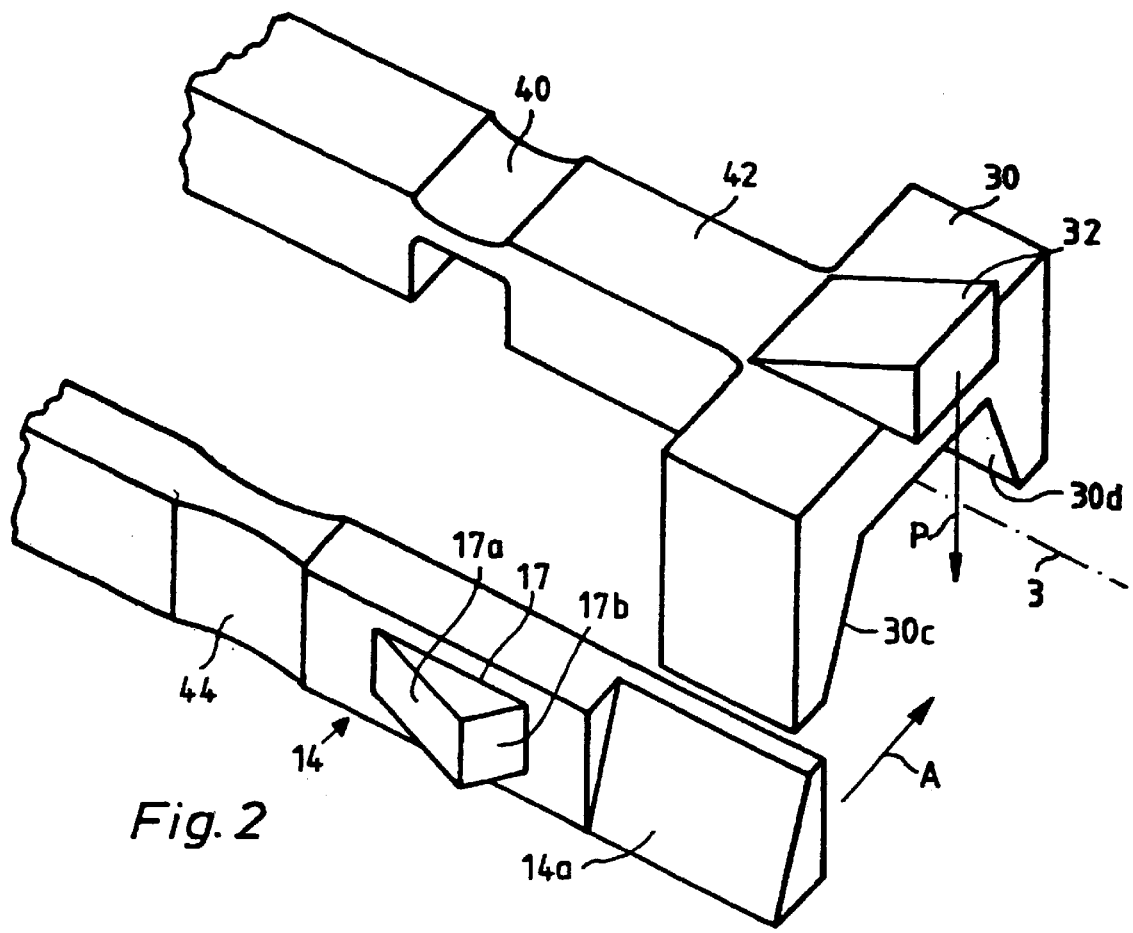

OPTICAL PLUG-IN CONNECTOR

CROSS-REFERENCE TO RELATED APPLICATION

This application is a continuation of copending International Application PCT/DE00/03198, filed Sep. 11, 2000, which designated the United States.

BACKGROUND OF THE INVENTION

Field of the Invention

The invention lies in the field of optical plug-in connector technology, and pertains to an optical plug-in connector with which ends of optical waveguides which are to be optically coupled are (releasably) connected. Usually, ends of optical waveguides to be coupled are held in precision holders, for example connector pins (also known as ferrules). The end face of the optical waveguide is positioned in the holder in such a way that it can be coupled and is aligned extremely accurately with its mating coupling element (for example a further end of an optical waveguide) by means of the precision holder. Both holders which individually receive a single optical waveguide end and holders for a multiplicity of optical waveguide ends are known.

The invention relates to an optical plug-in connector with a main axis running in a plugging direction, at least one optical waveguide end, and at least one locking part with a detent element.

A plug-in connector of the type is described in U.S. Pat. No. 4,798,430 (cf. German patent DE 38 18 717 C2) and comprises a plug-in connector housing which bears two connector pins at its end on the coupling side. Optical waveguide ends are accommodated by the connector pins in such a way that their end faces terminate with the end faces of the connector pins.

Locking levers (locking parts) are provided on each of the narrow sides of the housing, each with an outwardly facing detent element. The locking parts are directly molded onto the front end of the housing, so that their rear ends are resiliently deflectable. In the connected state, the detent elements lock with mating detent elements (locking position), which may be formed as locking lugs on a receptacle or socket receiving the plug-in connector. The locking serves for the mechanical fixing of the plug-in connector housing and, if need be, as a counter-bearing for contact forces between mating coupling elements assigned to the connector pins and the optical waveguide ends. This is because the connector pins are usually acted on by a biased spring, in order to have direct firm physical contact with the respective mating coupling element in the connected and plugged state.

To be able to release the plug-in connection as and when necessary, the coupling parts have rear actuating zones. When manual pressure is applied to the actuating zones, the locking parts move towards each other (release position), so that the detent elements disengage from their respective locking lug.

When a plurality of plug-in connectors of this type are arranged adjacently, however, an adequate space to allow the locking parts to be actuated must be provided on both sides of the narrow sides with regard to the release mechanism described above.

U.S. Pat. No. 5,359,686 (European published patent application EP 0 618 468 A1) discloses an interface between a light guide and an integrated circuit. A keyway paired mating makes it possible to position the optical waveguide within the circuit and lock it by means of a snap hook. For the release of the optical waveguide, the snap hook is formed in one piece with a lever, so that, when the lever is actuated, the snap hook is tilted out of the locking position. For exact positioning, the keyway pairing must be produced with very close tolerances, so that there is no play which would lead to the optical waveguide end being moved out of position by the point of action of the snap hook.

SUMMARY OF THE INVENTION

It is accordingly an object of the invention to provide an optical plug-in connector, which overcomes the above-mentioned disadvantages of the heretofore-known devices and methods of this general type and which plug-in connector can be manually released from a state wherein it is connected to a mating coupling element and allows a very close arrangement of adjacent plug-in connectors.

With the foregoing and other objects in view there is provided, in accordance with the invention, an optical plug-in connector, comprising:
a housing defining a plugging direction along a main axis;
at least one optical waveguide end facing in the plugging direction;
at least one locking part formed with a detent element movable between a locking position and a release position;
an actuating element for moving the detent element from the locking position into the release position;
the actuating element having a direction of movement substantially perpendicular to the main axis and different from a direction of movement of the detent element; and
the actuating element being formed separately from the locking part and being arranged, together with the locking part, at the housing.

In other words, the objects of the invention are achieved by an detent element which moves out of a locking position into a release position when the actuating element is actuated, the direction of movement of the actuating element running substantially perpendicular to the main axis and being different from the direction of movement of the detent element, on the one hand, and the actuating element being formed separately from the locking part and in this case both being arranged on a housing of the plug-in connector, on the other hand.

An important aspect of the plug-in connector according to the invention is that a separation of function and a separation of movement is provided between the detent element serving for locking, on the one hand, and the actuating element serving for moving the locking part or the detent element, on the other hand. The unlocking function is realized by actuation of the separate actuating element. In this case, the direction of movement of the actuating element is different from the direction of movement of the detent element. This allows an arrangement of the actuating element that is independent of the design of the locking part and, as a result, can be arranged in a position which is easily accessible in the connected state and does not require a critical installation space.

A mechanically preferred configuration of the plug-in connector according to the invention provides that the directions of movement of the actuating element and detent element are substantially perpendicular (orthogonal) to each other.

The resilient properties of the locking parts and the configuration of the locking arrangement may lead to transverse forces which, in an unfavorable case, increase the tendency for the plug-in connector and consequently the optical waveguide ends to be tilted. To counteract this, it is provided according to an advantageous development of the invention that the plug-in connector has two symmetrically arranged locking parts each with a detent element, and the actuating element moves the two detent elements.

A configuration of the plug-in connector according to the invention which is preferred from production engineering aspects provides that the actuating element and the locking part or the locking parts are resilient levers fastened to the plug-in connector or to a housing of the plug-in connector in the manner of cantilever beams.

A particularly space-saving and easily accessible arrangement of the actuating element is provided according to a preferred development of the invention if the actuating element is arranged in the region of the top side of the plug-in connector.

The action of the actuating element on the locking part or parts for moving the detent elements can be realized in various ways; for example, drivers may be provided on the actuating element, interacting with corresponding guides or slotted links on the locking parts. In accordance with a concomitant feature of the invention, which provides for a mechanically preferred configuration, the actuating element and the locking part or locking parts have co-operating inclined planes.

Other features which are considered as characteristic for the invention are set forth in the appended claims.

Although the invention is illustrated and described herein as embodied in an optical plug-in connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a perspective view of a plug-in connector according to the invention; and FIG. 2 is an enlarged partial view of a locking part and an actuating element.

DESCRIPTION OF THE PREFERRED EMBODIMENT

Referring now to the figures of the drawing in detail and first, particularly, to FIG. 1 thereof, the plug-in connector comprises a holder or ferrule 1 with a multiplicity of axial longitudinal bores 2, which run parallel to a main axis 3 of the plug-in connector. A plugging direction S coincides with the main axis 3. The plug-in connector can be inserted into a receptacle along the plugging direction S. The receptacle is not illustrated in detail, for reasons of clarity, but is indicated only by the windowed locking lugs 22 and 23. The axial bores 2 receive ends 6a of optical waveguides 6, which in the rearward direction enter a housing 9 of the plug-in connector through an anti-kink sleeve 8. The ends 6a terminate with their respective face on the coupling side with the end face 1a of the holder 1 in such a way that they can be coupled. Centering bores 10, 11 are formed on both sides of the row of optical waveguide ends with which the holder 1 is precisely aligned with respect to the mating coupling elements of the optical waveguide ends 6a.

Locking parts 14, 15 are molded symmetrically onto the narrow sides of the housing 9. Shaped inclined planes 14a, 15a are formed at the free ends 14b, 15b of the locking parts. Formed on the outer flanks of the locking parts there is each case a detent element 17, 18. The detent element is provided with a run-up slope 17a, 18a. When the plug-in connector is inserted in the plugging direction S into a receptacle, the run-up slopes 17a, 18a come into contact with edges 20, 21 of locking lugs 22, 33. The locking lugs 22, 33 may be part of the receptacle and have in each case a locking window 22a, 23a. During insertion, the locking parts are initially moved toward each other, so that the detent elements slide along the locking lugs 22, 23, until they pass through the respective locking window 22a, 23a. Striking of their rear stop face 17b, 18b against the adjoining edge of the respective locking window causes the detent elements to lock and, as a result, secure the plug-in connector against being pulled out in a direction counter to the plugging direction S. This is referred to as the locking position.

An actuating element 30 is arranged above the upper side of the housing, which is formed by the top side 9a of the plug-in connector. The actuating element may be molded onto an upper cover of the housing 9. In the exemplary embodiment, the actuating element has a rearwardly molded-on actuating lever 32 with a gripping face. It goes without saying that the actuating element may also be separately produced and only then connected to the upper side of the plug-in connector housing 9, the actuating element being formed as a resilient lever extending to the rear in the manner of a cantilever beam from a connecting region 33 with the housing 9. Similarly, the actuating lever 32 may be formed in a variety of ways, as suggested by the different embodiments shown in FIGS. 1 and 2.

To release the plug-in connector from the connected state represented in FIG. 1, the detent elements 17, 18 must be disengaged from the respective locking window 22a, 23a (release position). For this purpose, a compressive force D is exerted on the actuating lever 32 substantially perpendicularly to the main axis 3. The actuating element 30 consequently moves in the direction of the arrow P (FIG. 2) perpendicularly to the main axis 3 or to the plugging direction S toward the top side 9a. The actuating element is designed as a cross bar and is provided at its respective bar ends 30a, 30b with inclined planes (contact slopes) 30c, 30d. When the actuating element 30 is pressed down, the contact slopes 30c, 30d come into contact with cooperating contact slopes 14a, 15a at the free ends 14b, 15b of the cantilever-beam-like locking parts 14, 15. When it is pressed further down, the interaction of the inclined planes or slopes 30c, 14a and 30d, 15a causes the compressive force D to be transferred to the slopes 14a, 15a and the ends 14b, 15b of the locking parts to be moved toward each other in the direction of movement A, B, until the outer flanks of the locking parts assume the position indicated by dashed lines in FIG. 1.

In this position, the detent elements are in the release position (disengaged from the assigned locking windows), so that the plug-in connector can be pulled off rearward, counter to the plugging direction S.

FIG. 2 shows—in a greatly enlarged view and in exaggerated form—the actuating element 30 with the actuating zone 32 and the slopes 30c, 30d on the inner side. It can be seen here that the direction of movement A runs perpendicular to the main axis 3. The resilient mobility of the actuating element in the direction of movement P can be improved by a constriction 40 in the rear region of a holding bar 42, which is mounted on the top side 9a (FIG. 1). For representational reasons, FIG. 2 only shows one connecting part 14, the resilient properties of which can likewise be set by material constrictions with respect to the connecting region with the housing 9. For representational reasons, the sloping face 14a is shown a considerable distance away from the face 30c. However, when the actuating element 30 is actuated, the faces 14a, 30c are in effective contact, as described, so that the locking part 14 moves in the direction of movement B perpendicularly to the direction of movement P. The locking part 14 is provided with a bending constriction 44, similar to the constriction 40.

In the case of the illustrated configuration, the locking parts actually perform pivoting movements about their point of connection (virtual pivot point) with the housing. However, this is also to be regarded as a movement which, in terms of the present invention, runs perpendicular to the main axis of the plug-in connector. It is principally a movement component which is perpendicular to the main axis, so that even movements deviating from the perpendicular or curved movements are to be regarded as substantially perpendicular to the main axis.

Particularly advantageous in the case of the exemplary embodiment represented is the symmetrical arrangement of the detent elements, which makes it possible for the plug-in connector to be received in such a way that it is substantially free of transverse forces. The additional element (actuating element) can if need be move the locking parts and consequently transfer the detent elements from the locking position (FIG. 1) into the release position. The functional separation of the locking, on the one hand, and actuation of the locking parts, on the other hand, provides a greater freedom of design with regard to the actuation. The actuating element can be advantageously arranged in the region of the top side 9a. After the unlocking operation, the actuating element is let go again and springs back into the original position (locking position) in a way similar to the locking parts.

We claim:

1. An optical plug-in connector, comprising:

a housing defining a plugging direction along a main axis;

at least one optical waveguide end facing in the plugging direction;

two symmetrically disposed locking parts each formed with a detent element movable between a locking position and a release position;

an actuating element for moving said detent element from the locking position into the release position;

said actuating element having a direction of movement substantially perpendicular to said main axis and different from a direction of movement of said detent element;

said actuating element being formed separately from said locking part and being arranged, together with said locking parts, at said housing; and said actuating element being a resilient lever fastened as a cantilever beam and configured as a cross bar with bar ends adapted to move said detent elements from the locking position into the release position.

2. The plug-in connector according to claim 1, wherein the direction of movement of said actuating element and the direction of movement of said detent element are substantially perpendicular to each other.

3. The plug-in connector according to claim 1, wherein said locking part is one of two symmetrically arranged locking parts each formed with a respective said detent element, and said actuating element is configured to move both said detent elements.

4. The plug-in connector according to claim 3, wherein said actuating element and said locking parts are resilient levers fastened as cantilever beams.

5. The plug-in connector according to claim 4, wherein said actuating element and said locking parts are fastened to said housing.

6. The plug-in connector according to claim 3, wherein said actuating element and said locking parts are formed with operatively connectible, inclined planes.

7. The plug-in connector according to claim 1, wherein said actuating element and said locking part are resilient levers fastened as cantilever beams.

8. The plug-in connector according to claim 7, wherein said actuating element and said locking part are fastened to said housing.

9. The plug-in connector according to claim 1, wherein said housing defines a top side of the plug-in connector and said actuating element is disposed at the top side.

10. The plug-in connector according to claim 1, wherein said actuating element and said locking part are formed with operatively connectible, inclined planes.

* * * * *